US012592459B2

(12) United States Patent
Xiao et al.

(10) Patent No.: US 12,592,459 B2
(45) Date of Patent: Mar. 31, 2026

(54) ADAPTER COMPONENT, BATTERY CELL, BATTERY, ELECTRICAL DEVICE, AND METHOD AND DEVICE FOR MANUFACTURING BATTERY CELL

(71) Applicant: CONTEMPORARY AMPEREX TECHNOLOGY (HONG KONG) LIMITED, Hong Kong (CN)

(72) Inventors: Haihe Xiao, Ningde (CN); Xiaowen Zhang, Ningde (CN); Qiang Liu, Ningde (CN); Xigen Zhou, Ningde (CN); Mingxiang Lin, Ningde (CN); Wei Zhong, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 378 days.

(21) Appl. No.: 18/106,511

(22) Filed: Feb. 7, 2023

(65) Prior Publication Data

US 2023/0187791 A1 Jun. 15, 2023

Related U.S. Application Data

(63) Continuation of application No. PCT/CN2021/121994, filed on Sep. 30, 2021.

(51) Int. Cl.
H01M 50/548 (2021.01)
H01M 50/103 (2021.01)
(Continued)

(52) U.S. Cl.
CPC ....... H01M 50/533 (2021.01); H01M 50/103 (2021.01); H01M 50/176 (2021.01);
(Continued)

(58) Field of Classification Search
CPC ............ H01M 50/533; H01M 50/503; H01M 50/103; H01M 50/176; H01M 50/184;
(Continued)

(56) References Cited

U.S. PATENT DOCUMENTS

| | | | |
|---|---|---|---|
| 2011/0104562 A1 | 5/2011 | Byun et al. | |
| 2012/0251874 A1 | 10/2012 | Guen | |
| 2015/0004447 A1 | 1/2015 | Li et al. | |
| 2023/0104632 A1* | 4/2023 | Yamada | H01M 50/103 |
| | | | 429/181 |
| 2023/0143369 A1* | 5/2023 | Yano | H01M 50/20 |
| | | | 180/68.5 |

FOREIGN PATENT DOCUMENTS

| | | |
|---|---|---|
| CN | 1427489 A | 7/2003 |
| CN | 103326061 A | 9/2013 |

(Continued)

OTHER PUBLICATIONS

DE102018204592—Eng Trans (Year: 2019).*

(Continued)

*Primary Examiner* — Stephen J Yanchuk
(74) *Attorney, Agent, or Firm* — XSENSUS LLP

(57) ABSTRACT

An adapter may include a first adapter and a second adapter disposed discretely. The first adapter may be configured to be connected to one of an electrode post or a tab. The second adapter may be configured to be connected to the other of the electrode post or the tab. The first adapter may substantially extend along a first direction. The second adapter may substantially extend along a second direction. The first direction may intersect the second direction. The first adapter may be connected to the second adapter by a conductive structure.

9 Claims, 5 Drawing Sheets

(51) Int. Cl.

| | |
|---|---|
| *H01M 50/176* | (2021.01) |
| *H01M 50/184* | (2021.01) |
| *H01M 50/188* | (2021.01) |
| *H01M 50/533* | (2021.01) |
| *H01M 50/553* | (2021.01) |
| *H01M 50/564* | (2021.01) |
| *H01M 50/567* | (2021.01) |
| *H01M 50/588* | (2021.01) |
| *H01M 50/593* | (2021.01) |

(52) U.S. Cl.
CPC ....... *H01M 50/184* (2021.01); *H01M 50/188* (2021.01); *H01M 50/548* (2021.01); *H01M 50/553* (2021.01); *H01M 50/564* (2021.01); *H01M 50/567* (2021.01); *H01M 50/588* (2021.01); *H01M 50/593* (2021.01); *H01M 2220/20* (2013.01)

(58) Field of Classification Search
CPC ............. H01M 50/188; H01M 50/553; H01M 50/564; H01M 50/567; H01M 50/588; H01M 50/593; H01M 50/209; H01M 50/516; H01M 50/548
See application file for complete search history.

(56) References Cited

FOREIGN PATENT DOCUMENTS

| | | | | |
|---|---|---|---|---|
| CN | 208014753 U | 10/2018 | | |
| CN | 209312883 U | 8/2019 | | |
| CN | 113113738 A | 7/2021 | | |
| DE | 102018204592 A1 * | 10/2019 | .......... | H01M 50/553 |
| WO | WO-2019050180 A1 * | 3/2019 | ........... | H01M 50/50 |
| WO | 2022/047791 A1 | 3/2022 | | |

OTHER PUBLICATIONS

WO2019050180 Eng translation (Year: 2019).*
Expended European Search Report issued Jul. 8, 2024 in European Patent Application No. 21952110.1.
Office Action issued May 7, 2024 in Japanese Patent Application No. 2023-507603 with English translation thereof.
International Search Report mailed on Jun. 23, 2022, received for PCT Application PCT/CN2021/121994, filed on Sep. 30, 2021, 6 pages including English Translation.

* cited by examiner

1000

100

ADAPTER COMPONENT, BATTERY CELL, BATTERY, ELECTRICAL DEVICE, AND METHOD AND DEVICE FOR MANUFACTURING BATTERY CELL

CROSS-REFERENCE TO RELATED APPLICATION

The present application is a continuation of International Application No. PCT/CN2021/121994, filed Sep. 30, 2021, which is incorporated herein by reference in its entirety.

TECHNICAL FIELD

This application relates to the technical field of batteries, and in particular, to an adapter component, a battery cell, a battery, an electrical device, and a method and device for manufacturing a battery cell.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

The battery cell includes a housing, an end cap, and an electrode assembly disposed in the housing. An electrode post is disposed on the end cap. In a process of assembling a battery cell, it is necessary to put the electrode assembly into the housing, connect the electrode assembly to the electrode post on the end cap, and then weld the end cap to the housing to complete the assembling. Evidently, the process of assembling the battery cell is complicated.

SUMMARY

In view of the foregoing problems, this application provides an adapter component, a battery cell, a battery, an electrical device, and a method and device for manufacturing a battery cell to simplify the assembling of the battery cell.

According to a first aspect, this application provides an adapter component or adapter applicable to a battery cell. The adapter component includes a first adapter piece or adapter and a second adapter piece or adapter disposed discretely. The first adapter piece is configured to be connected to one of an electrode post or a tab. The second adapter piece is configured to be connected to the other of the electrode post or the tab. The first adapter piece substantially extends along a first direction. The second adapter piece substantially extends along a second direction. The first direction intersects the second direction. The first adapter piece is connected to the second adapter piece by a conductive structure.

In the technical solution of embodiments of this application, the adapter component is designed to include a first adapter piece and a second adapter piece disposed discretely. Therefore, during assembling, the first adapter piece may be connected to the electrode post in advance, and then the second adapter piece is connected to the tab of the electrode assembly, and then the electrode assembly is put into the housing. Subsequently, the ends of the first adapter piece and the second adapter piece are connected by a conductive structure, so that the electrode assembly is loaded into the housing.

In some embodiments, the first adapter piece includes a first main section or structure and a first connecting section or connector disposed at an end of the first main section. The first main section is configured to be connected to one of the electrode post or the tab. The first main section extends along the first direction. The first connecting section extends along the second direction. The first connecting section is connected to the second adapter piece. The disposed first connecting section increases a connection area between the first adapter piece and the second adapter piece, and facilitates connection.

In some embodiments, the second adapter piece includes a second main section or structure and a second connecting section or connector connected to the first connecting section. The second main section is configured to be connected to the other of the electrode post or the tab. The first connecting section extends toward a side close to the second main section against the first main section; or, the first connecting section extends toward a side away from the second main section against the first main section; or, in the second direction, the first connecting section extends toward both sides against the first main section.

In some embodiments, the first connecting section and the first main section are integrally formed.

The conductive structure includes a welding structure, a conductive adhesive bonding structure, a riveting structure, or a conductive element.

According to a second aspect, this application provides a battery cell. The battery cell includes a shell, an electrode post, an electrode assembly, and the adapter component described above. The shell includes an accommodation cavity. The electrode assembly is accommodated in the accommodation cavity. The shell includes a housing and an end cap. The housing is integrally formed. The housing includes two first sidewalls disposed opposite to each other in a second direction and two second sidewalls disposed opposite to each other in a third direction. The two first sidewalls and the two second sidewalls close in to form the accommodation cavity. The housing includes at least one opening in a first direction. The first direction, the second direction, and the third direction are perpendicular to each other. The electrode assembly includes a body portion and a tab extending from the body portion toward the opening. The electrode post is disposed on a first sidewall. The end cap is disposed at the opening to close the accommodation cavity. The first adapter piece is connected to the electrode post. The second adapter piece is connected to the tab.

In some embodiments, there are two electrode posts. The two electrode posts are disposed on the two first sidewalls respectively.

In some embodiments, the tab includes a positive tab and a negative tab. The positive tab and the negative tab are disposed at a same end of the body portion.

In some embodiments, the electrode post is riveted or injection-molded onto the first sidewall.

According to a third aspect, this application provides a battery, including the battery cell.

According to a fourth aspect, this application provides an electrical device, including the battery described above.

According to a fifth aspect, this application provides a method for manufacturing a battery cell, including the following steps:

providing an integrally formed housing, an electrode post, and an end cap, where the housing includes at least one opening in a first direction, and includes two first sidewalls disposed opposite to each other in a second direction and two second sidewalls disposed opposite to each other in a third direction, the two first sidewalls and the two second sidewalls close in to form an accommodation cavity, and the first direction, the second direction, and the third direction are perpendicular to each other;

providing an electrode assembly, where the electrode assembly includes a body portion and a tab extending from the body portion toward the opening; and providing an adapter component, where the adapter component includes a first adapter piece and a second adapter piece disposed discretely, disposing the electrode post on the first sidewall, connecting the first adapter piece to the electrode post, connecting the second adapter piece to the tab, putting the electrode assembly into the housing, electrically connecting the first adapter piece and the second adapter piece, and disposing the end cap at the opening to close the accommodation cavity.

According to a sixth aspect, this application provides a device for manufacturing a battery cell, including:

a first providing module, configured to provide an integrally formed housing, an electrode post, and an end cap, where the housing includes two first sidewalls disposed opposite to each other in a second direction and two second sidewalls disposed opposite to each other in a third direction, the two first sidewalls and the two second sidewalls close in to form an accommodation cavity, and the housing includes at least one opening in a first direction;

a second providing module, configured to provide an electrode assembly, where the electrode assembly includes a body portion and a tab extending outward from the body portion;

a third providing module, configured to provide an adapter component, where the adapter component includes a first adapter piece and a second adapter piece disposed discretely; and an assembling module, configured to mount the electrode post on a first sidewall, connect the first adapter piece to the electrode post, connect the second adapter piece to the tab, put the electrode assembly into the accommodation cavity, electrically connect the first adapter piece and the second adapter piece, and dispose the end cap at the opening to close the accommodation cavity.

The foregoing description is merely an overview of the technical solutions of this application. The following expounds specific embodiments of this application to enable a clearer understanding of the technical means of this application, enable implementation thereof based on the content of the specification, and make the foregoing and other objectives, features, and advantages of this application more evident and comprehensible.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
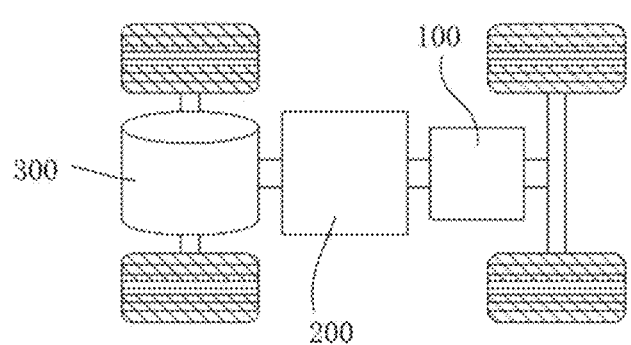
FIG. 1 is a schematic structural diagram of a vehicle according to some embodiments of this application.

The drawings are not drawn to scale.

REFERENCE NUMERALS vehicle 1000;
battery 100, controller 200, motor 300;
box 10, first part 11, second part 12;
battery cell 20, housing 21, first sidewall 211, post mounting hole 211*a*, second sidewall 212, opening 213, electrode assembly 22, body portion 221, tab 222, electrode post 23, inner post 231; outer post 232; insulation sleeve 233; sealing ring 234; first insulation spacer 235; second insulation spacer 236; end cap 24; adapter component 26, first adapter piece 261, first main section 2611, first connecting section 2612, second adapter piece 262, second main section 2621, second connecting section 2622;
device 30 for manufacturing a battery cell, first providing module 31, second providing module 32, third providing module 33, assembling module 34.

DETAILED DESCRIPTION OF EMBODIMENTS

Embodiments of the technical solutions of this application are described in detail below with reference to the drawings. The following embodiments are merely intended to describe the technical solutions of this application more clearly, and serve merely as examples but without hereby limiting the protection scope of this application.

Unless otherwise defined, all technical and scientific terms used herein have the same meanings as commonly understood by a person skilled in the technical field of this application. The terms used herein are merely intended to describe specific embodiments but not intended to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish different objects but not intended to indicate or imply relative importance or implicitly specify the number of the indicated technical features, the specific order, or order of priority. In the description of the embodiments of this application, unless otherwise expressly specified, "a plurality of" means two or more.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

Currently, a battery cell generally includes a housing, an end cap, and an electrode assembly accommodated in the housing. The housing is filled with an electrolyte. The electrode assembly is a component that reacts electrochemically in the battery cell. The housing is a component that forms an internal environment of the battery cell. The end cap is a component that fits the opening of the housing to isolate the internal environment of the battery cell from an external environment. In some existing battery cells, a positive post and a negative post are generally disposed on the same end cap. The direction in which the electrode posts are disposed is the same as the direction in which the tabs of the electrode assembly extend. This design restricts the positive and negative electrode connection between battery cells to occur only at the same end. To solve such a problem, the housing of some other existing battery cells includes two openings opposite to each other in a length direction, and end caps fitted to the two openings respectively. The positive post and the negative post are disposed on the two end caps respectively. Through research, the inventor of this application finds that, during the assembling of the battery cells, the electrode assembly needs to enter the housing from one opening and move to another opening, so that the electrode assembly has to move for a relatively long distance when entering the housing. Moreover, before entry into the housing, the tab of the electrode assembly needs to be connected to the electrode post on an end cap first, and then the electrode assembly is put into the housing before the end cap is welded to the housing. Therefore, the assembling process is complicated and difficult.

To alleviate the complexity of assembling the battery cells, the inventor has found through research that a battery cell may include an integrally formed housing, and two electrode posts are mounted onto two opposite sidewalls of the housing in an integrated manner. In this way, during loading of the electrode assembly into the housing, the electrode assembly does not need to be connected to the end cap in advance, thereby facilitating the loading of the electrode assembly into the housing, and simplifying the assembling process of the battery cell.

The battery cell disclosed in embodiments of this application is applicable to, but without being limited to, electrical devices such as a vehicle, watercraft, or aircraft. A power supply system of the electrical devices may contain the battery cell, the battery, and the like disclosed in this application.

An embodiment of this application provides an electrical device powered by a battery. The electrical device may be, but without being limited to, a mobile phone, a tablet, a notebook computer, an electric toy, an electric tool, an electric power cart, an electric vehicle, a ship, a spacecraft, and the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to some embodiments of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a drive power supply of the vehicle 1000 to provide driving power for the vehicle 1000 in place of or partly in place of oil or natural gas.

Figure 2:
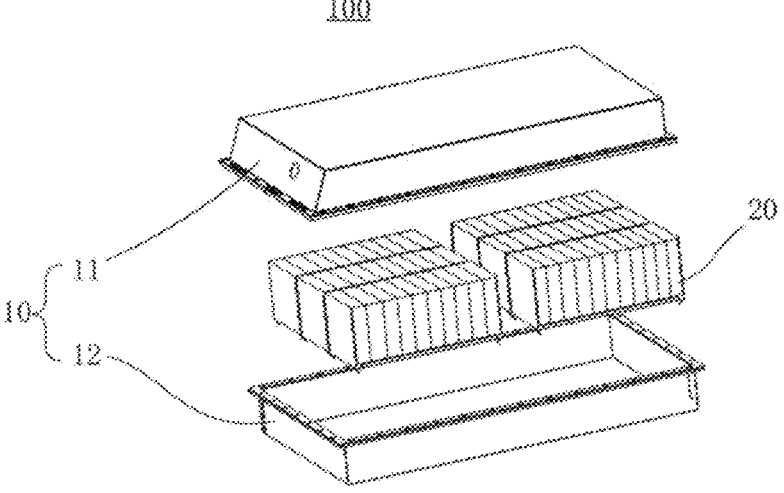
FIG. 2 is a schematic structural exploded view of a battery according to some embodiments of this application.

Referring to FIG. 2, FIG. 2 is an exploded view of a battery 100 according to some embodiments of this application. The battery 100 includes a box 10 and a battery cell 20. The battery cell 20 is accommodated in the box 10. The box 10 is configured to provide an accommodation space for the battery cell 20. The box 10 may be in various structures. In some embodiments, the box 10 may include a first part 11 and a second part 12. The first part 11 and the second part 12 fit and cover each other. The first part 11 and the second part 12 together define an accommodation space configured to accommodate the battery cell 20. The second part 12 may be a hollowed-out structure that is opened at one end. The first part 11 may be a plate-like structure. The first part 11 fits the opening of the second part 12 so that the first part 11 and the second part 12 together define the accommodation space. Alternatively, the first part 11 and the second part 12 each may be a hollowed-out structure that is opened at one end. The opening of the first part 11 fits and covers the opening of the second part 12. Definitely, the box 10 formed by the first part 11 and the second part 12 may be in various shapes, such as a cylinder or a cuboid.

The battery 100 may contain a plurality of battery cells 20. The plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery 100 in the form of battery modules first. A plurality of battery modules are then connected in series, parallel, or series-and-parallel pattern to form a whole for being accommodated in the box 10. The battery 100 may further include other structures. For example, the battery 100 may further include a busbar component. The busbar component is configured to implement electrical connection between the plurality of battery cells 20.

Each battery cell 20 may be, but without being limited to, a secondary battery or primary battery; or may be a lithium-sulfur battery, a sodium-ion battery, or a magnesium-ion battery. The battery cell 20 may be in the shape of a cylinder, flat body, cuboid, or the like.

Figure 3:
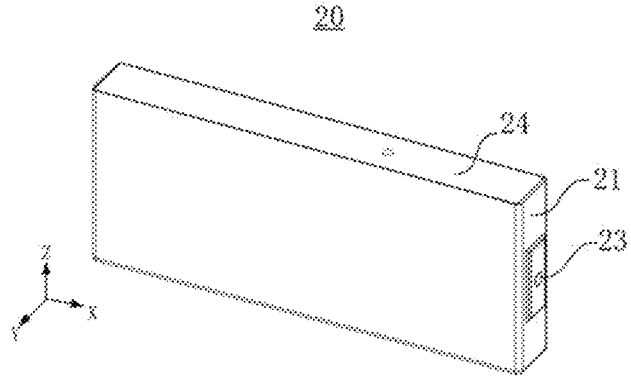
FIG. 3 is a three-dimensional schematic structural diagram of a battery cell according to some embodiments of this application.

Referring to FIG. 3, FIG. 3 is a three-dimensional schematic structural diagram of a battery cell 20 according to some embodiments of this application. As shown in FIG. 3, referring to FIG. 5, the battery cell 20 includes a housing 21, an electrode assembly 22, an electrode post 23, and other functional components.

The housing 21 is a component configured to form an internal environment of the battery cell 20. The formed internal environment may be used to accommodate the electrode assembly 22, an electrolytic solution, and other components. The housing 21 may be in various shapes and sizes, such as a cuboid, cylinder, or hexagonal prism. Specifically, the shape of the housing 21 may be determined depending on the specific shape and size of the electrode assembly 22. The housing 21 may be made of a variety of materials such as copper, iron, aluminum, stainless steel, aluminum alloy, or plastic, without being particularly limited herein.

The electrode assembly 22 is a component that reacts electrochemically in the battery cell 20. The housing 21 may contain one or more electrode assemblies 22. The electrode assembly 22 is typically formed of a positive electrode plate and a negative electrode plate that are wound or stacked together. Generally, a separator is disposed between the positive electrode plate and the negative electrode plate. The parts, coated with an active material, of the positive electrode plate and the negative electrode plate, constitute a body portion 221 of the electrode assembly. The part, coated with no active material, of the positive electrode plate and the negative electrode plate separately, constitutes a tab 222. In a charge-and-discharge process of the battery, the positive active material and the negative active material react with an electrolytic solution. The electrode post 23 is electrically connected to the electrode assembly 22, and configured to output or input electrical energy of the battery cell 20.

The end cap 24 is a component that fits and covers the opening of the housing 21 to isolate the internal environment of the battery cell 20 from the external environment. Without limitation, the shape of the end cap 24 may be adapted to the shape of the housing 21 to fit the housing 21. Optionally, the end cap 24 may be made of a material of appropriate hardness and strength (such as aluminum alloy), so that the end cap 24 is not prone to deform when squeezed or impacted. In this way, the battery cell 20 achieves higher structural strength and higher safety performance. In some embodiments, the end cap 24 may be equipped with a pressure relief mechanism configured to release an internal pressure when the internal pressure or temperature of the battery cell 20 reaches a threshold. The end cap 24 may be made of a variety of materials such as copper, iron, aluminum, stainless steel, aluminum alloy, or plastic, without being particularly limited herein.

Figure 4:
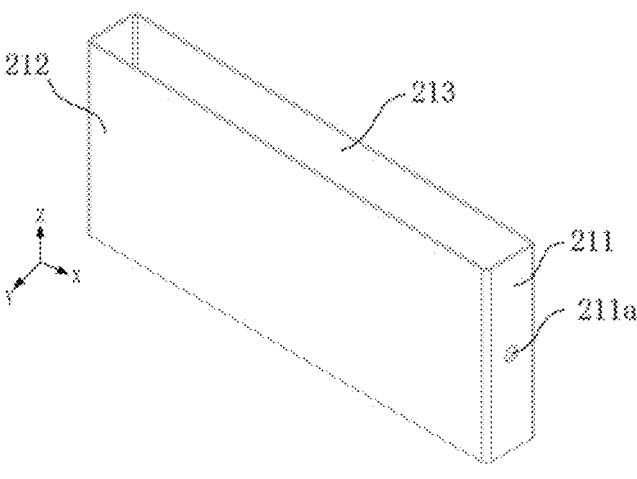
FIG. 4 is a three-dimensional schematic structural diagram of a housing of a battery cell according to some embodiments of this application.
Figure 5:
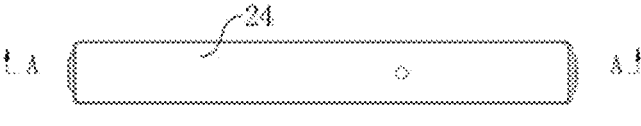
FIG. 5 is a schematic structural top view of a battery cell according to some embodiments of this application.
Figure 6:
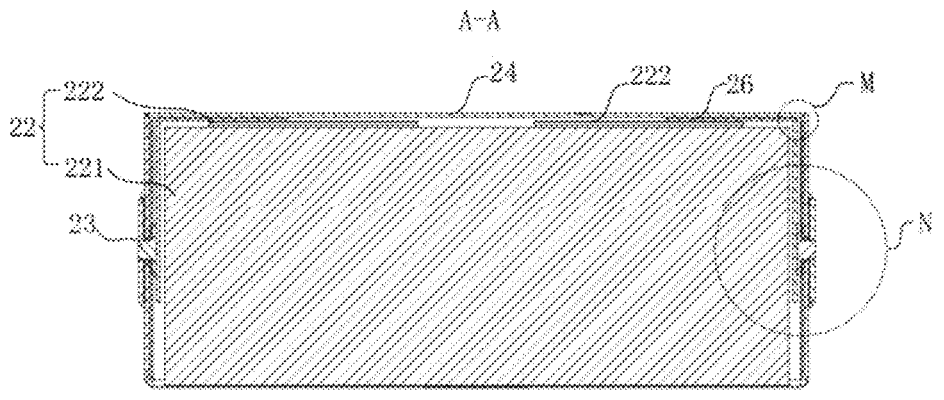
FIG. 6 is schematic structural sectional view of the battery cell shown in FIG. 5 and sectioned along a direction A-A.

Referring to FIG. 3 to FIG. 6, FIG. 3 is a three-dimensional schematic structural diagram of a battery cell according to some embodiments of this application; and FIG. 4 is a three-dimensional schematic structural diagram of a housing of a battery cell according to some embodiments of this application. FIG. 5 is a schematic structural top view of a battery cell according to some embodiments of this application; and FIG. 6 is schematic structural sectional view of the battery cell shown in FIG. 5 and sectioned along a direction A-A. The battery cell 20 includes a housing 21, an electrode assembly 22, and two electrode posts 23. The housing 21 is integrally formed, and includes at least one opening in a first direction Z, two first sidewalls 211 disposed opposite to each other in a second direction X and two second sidewalls 212 disposed opposite to each other in a third direction Y. The two first sidewalls 211 and the two second sidewalls 212 close in to form an accommodation cavity. The first direction Z, the second direction X, and the third direction Y are perpendicular to each other. The electrode assembly 22 is accommodated in the accommodation cavity. The electrode assembly 22 includes a body portion 221 and two tabs 222 that extend outward from the body portion 221 and that are of opposite polarities. The two electrode posts 23 are disposed on the two first sidewalls 211 respectively and are electrically connected to the two tabs 222 respectively.

As shown in FIG. 3, the first direction Z is a height direction of the battery cell 20, the second direction X is a length direction of the battery cell 20, and the third direction Y is a thickness direction of the battery cell 20. That the first sidewalls 211 are disposed in the second direction X means that the first sidewalls 211 are located in an extending direction of the second direction X and the first sidewalls 211 are perpendicular to the second direction X. Similarly, that the second sidewalls 212 are disposed in the third direction Y means that the second sidewalls 212 are located in an extending direction of the third direction Y and the second sidewalls 212 are perpendicular to the third direction Y. The opening 213 disposed in the first direction Z means that at least one surface of the housing 21 in the first direction Z is open.

As shown in FIG. 4, an post mounting hole 211a is made on the first sidewall 211 of the housing 21. The electrode post 23 is mounted in the post mounting hole 211a. As shown in FIG. 5 and FIG. 6, both tabs 222 of the electrode assembly 22 extend out from the same end of the body portion 221. In other embodiments, the two tabs 222 of the electrode assembly 22 may extend out from different ends of the body portion 221 respectively. For example, referring to FIG. 6, the two tabs 222 may extend from a left end and a right end of the body portion 221 respectively. This also facilitates the connection between the tab 222 and the electrode post 23. For example, the connection between the electrode post 23 and the tab 222 may be implemented by penetration welding or other means.

The two electrode posts 23 are disposed on the two first sidewalls 211 of the integrally formed housing 21 respectively. Therefore, during loading of the electrode assembly 22 into the housing, the movement distance of the electrode assembly is a distance along the width direction of the housing 21, and is shortened, thereby facilitating the loading of the electrode assembly into the housing. In addition, the two electrode posts are mounted onto two opposite sidewalls of the housing in an integrated manner. In this way, during loading of the electrode assembly into the housing, the electrode assembly does not need to be connected to the end cap in advance, thereby facilitating the loading of the electrode assembly into the housing, and simplifying the assembling process of the battery cell. Moreover, the two electrode posts of the battery cell 20 are disposed on the two first sidewalls 211 respectively. In this way, a water cooling component can be arranged on both an upper side and a lower side of the battery cell 20, thereby enlarging the area for arrangement of the water cooling component and improving the heat dissipation performance of the battery.

In some embodiments, the housing 21 is integrally formed by an extrusion molding process or a stretching process.

According to some embodiments of this application, the housing 21 further includes a bottom wall disposed opposite to the opening 213. The battery cell 20 further includes an end cap 24. The end cap 24 is disposed at the opening 213 to close the accommodation cavity.

As shown in FIG. 4, the area of the first sidewall 211 is less than the area of the second sidewall 212. In this way, the housing 21 includes five surfaces, that is, two major faces (the sidewalls 212), two minor faces (the first sidewalls 211), and a bottom face. The electrode posts 23 are directly fitted onto the two minor faces of the housing 21, that is, the first sidewalls 211. In this way, after the electrode assembly 22 is put into the housing 21, the housing 21 can be closed by just welding one end cap 24 to the housing 21, thereby simplifying the assembling process of the battery cell in contrast to the practice in the prior art in which two end caps need to be welded.

According to some embodiments of this application, the housing 21 includes two openings 213 that are opposite to each other in the first direction Z. The battery cell 20 further includes two end caps 24. The two end caps 24 are disposed at the two openings 213 respectively to close the accommodation cavity.

In this case, the housing 21 includes four faces, that is, two major faces and two minor faces. The housing is vertically through in the first direction Z, and includes two openings located in the first direction Z. Because the housing 21 is through in the first direction Z, the housing can be formed by one-time stretching in a simple process.

According to some embodiments of this application, the area of the first sidewall 211 is less than the area of the second sidewall 212. In this way, the second sidewalls 212 of the housing 21 are disposed in the same direction as the major faces of the electrode assembly 22, and the first sidewalls 211 of the housing 21 are disposed in the thickness direction of the electrode assembly 22, thereby facilitating the loading of the electrode assembly 22 into the housing.

According to some embodiments of this application, the electrode post 23 is riveted or injection-molded onto the first sidewall 211. As shown in FIG. 4, an post mounting hole 211a is made on the first sidewall 211. Before the electrode assembly 23 is loaded into the housing, the electrode posts 23 have been directly mounted in the post mounting holes 211a of the two first sidewalls 211 respectively by riveting or injection-molding.

Figure 8:
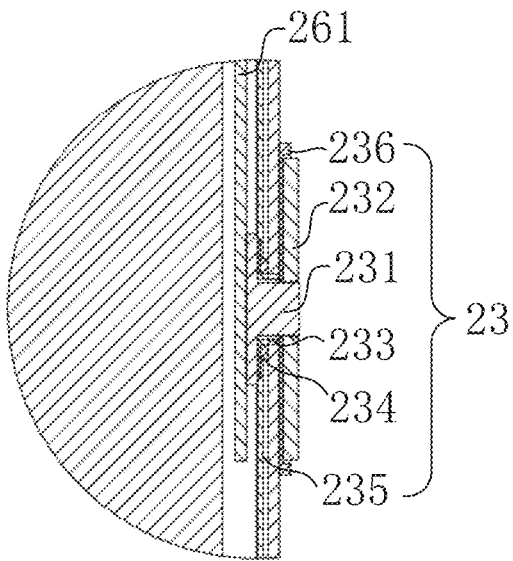
FIG. 8 is a schematic close-up view of a local structure of a part N shown in FIG. 6.

Referring to FIG. 8, the electrode post 23 includes an inner post 231, an outer post 232, a sealing sleeve 233, a sealing ring 234, a first insulation spacer 235, and a second insulation spacer 236. The inner post 231 passes through the post mounting hole 211a of the first sidewall 211 and is partly exposed outside the first sidewall 211. The outer post 232 sheathes the inner post 231. The sealing sleeve 233 sheathes the inner post 231 to isolate the first sidewall 211 from the inner post 231. The sealing ring 234 is pressed against an outer wall of the sealing sleeve 233 so that an inner wall of the sealing sleeve 233 is in contact with an outer wall of the inner post 231. The drawing shows a state when the inner wall of the sealing sleeve is out of contact with the outer wall of the inner post during the assembling. However, after completion of assembling, the inner wall of the sealing sleeve 233 is in contact with the outer wall of the inner post 231. To avoid electrical connection between the electrode post 23 and the housing 21, a first insulation spacer 235 is disposed between the inner post 231 and an inner wall face of the first sidewall 211 of the housing 21. In addition, the first insulation spacer 235 is disposed on both sides of the inner post 231. A second insulation spacer 236 is disposed between the outer post 232 and an outer wall face of the first sidewall 211 of the housing 21. The second insulation spacer 236 includes a groove configured to snap-fit the outer post 232.

The sealing ring 234 may be made of fluororubber.

As shown in FIG. 6, both tabs 222 extend out from the body portion 221 toward the opening 213. The electrode post 23 is disposed on the first sidewall 221 of the housing 21. That is, the protruding direction of the tabs 222 is different from the protruding direction of the electrode posts 23. Therefore, the tabs 222 need to be connected to the electrode posts 23 by an adapter component 26. During the research, the inventor finds that, if the tabs 222 are connected to the electrode posts 23 by an integrated adapter component 26, the assembling of the battery cell 20 is not practicable. For example, the adapter component 26 is connected to the tabs 222 first, and then the electrode assembly 22 with the connected adapter component 26 is put into the housing 21. In this case, no space is left for welding the adapter component 26 to the electrode post 23. For another example, if the adapter component 26 is welded to the electrode posts 23 first, the adapter component 26 obstructs the loading of the electrode assembly 22 into the housing, and makes the electrode assembly 22 unable to enter the housing.

In response to this problem, the inventor of this application proposes to make the adapter component 26 into a first adapter piece 261 and a second adapter piece 262 disposed discretely. The first adapter piece 261 is configured to be connected to one of an electrode post or a tab. The second adapter piece 262 is configured to be connected to the other of the electrode post 23 or the tab 222. The first adapter piece 261 substantially extends along a first direction Z. The second adapter piece 262 substantially extends along a second direction X. The first direction Z intersects the second direction X. The first adapter piece 261 is connected to the second adapter piece 262 by a conductive structure.

As shown in FIG. 6, both tabs 222 extend out from the body portion 221 toward the opening 213. The battery cell 20 further includes an adapter component 26. The adapter component 26 includes a first adapter piece 261 and a second adapter piece 262 disposed discretely. The first adapter piece 261 is configured to be connected to the electrode post 23, and the second adapter piece 262 is configured to be connected to the tab 222. The first adapter piece 261 substantially extends along the first direction Z. The second adapter piece 262 substantially extends along the second direction X. The first adapter piece 261 is connected to the second adapter piece 262 by a conductive structure.

The adapter component 26 is designed to include a first adapter piece 261 and a second adapter piece 262 disposed discretely. Therefore, during assembling, the first adapter piece 261 may be connected to the electrode post 23 in advance, and then the second adapter piece 262 is connected to the tab 222 of the electrode assembly 22, and then the electrode assembly 22 is put into the housing 21. Subsequently, the ends of the first adapter piece 261 and the second adapter piece 262 are connected by a conductive structure, so that the electrode assembly 22 is loaded into the housing. After the ends of the first adapter piece 261 and the second adapter piece 262 are connected by the conductive structure, the end cap 24 is welded to the housing 21 to complete sealing the battery cell 20.

In other embodiments, the first adapter piece 261 may be connected to the tab instead, and the second adapter piece 262 may be connected to the electrode post.

In some embodiments, the extending direction of the first adapter piece 261 is perpendicular to the extending direction of the second adapter piece 262. In some other embodiments, the extending direction of the first adapter piece 261 intersects and is at an angle to the extending direction of the second adapter piece 262.

According to some embodiments of this application, the conductive structure includes a welding structure, a conductive adhesive bonding structure, a riveting structure, or a conductive element. The conductive connection implemented by a welding structure means that the first adapter piece 261 is connected to the second adapter piece 261 by laser welding or other means of welding. The conductive connection implemented by a conductive adhesive bonding structure means that the first adapter piece 261 is bonded to the second adapter piece 262 by using a conductive adhesive. The conductive adhesive may be a conductive adhesive film. The conductive adhesive can not only implement electrical connection between the first adapter piece 261 and the second adapter piece 262, but also implement mechanical connection between the two adapter pieces. The conductive connection implemented by a riveting structure means that the first adapter piece 261 and the second adapter piece 262 are connected to each other by a rivet.

Figures 9, 10:
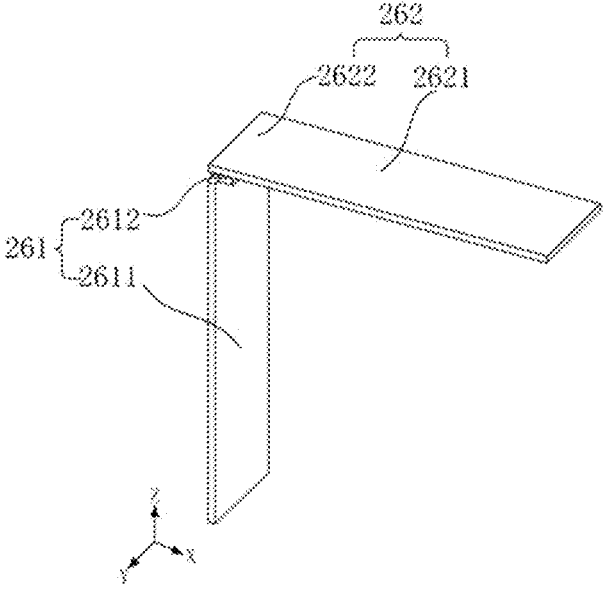
FIG. 9 is a three-dimensional schematic structural diagram of an adapter component according to some embodiments of this application.
FIG. 10 is a schematic structural front view of an adapter component shown in FIG. 9.

According to some embodiments of this application, as shown in FIG. 9, the first adapter piece 261 includes a first main section 2611 and a first connecting section 2612 disposed at an end of the first main section 2611. The first main section 2611 is configured to be connected to the electrode post 23. The first main section 2611 extends along the first direction Z. The first connecting section 2612 extends along the second direction X. The first connecting section 2612 is connected to the second adapter piece 262.

The first adapter piece 261 includes a first main section 2611 and a first connecting section 2612 disposed at an end of the first main section 2611. The first connecting section 2612 is configured to be connected to the second adapter piece 262, thereby enlarging the connection area between the first adapter piece 261 and the second adapter piece 262, and facilitating connection.

The first connecting section 2612 and the first main section 2611 are integrally formed. For example, the first connecting section 2612 is bent sideways against the first main section 2611 by using a bending tool.

Alternatively, in other embodiments, the first adapter piece 261 may include the first main section 2611 alone, and the first main section 2611 is connected to the second adapter piece 262 directly.

According to some embodiments of this application, the second adapter piece 262 includes a second main section 2621 and a second connecting section 2622 connected to the first connecting section 2612. The second main section 2621 is configured to be connected to the electrode post 23. The first connecting section 2612 extends toward a side close to the second main section 2621 against the first main section 2611. Alternatively, the first connecting section 2612 extends toward a side away from the second main section 2621 against the first main section 2611.

In a possible embodiment, the first connecting section 2612 extends toward a side close to the second main section 2621 against the first main section 2611. In another possible embodiment, the first connecting section 2612 extends toward a side away from the second main section 2621 against the first main section 2611. In both embodiments described above, a cross section of the first adapter piece 261 is L-shaped. The difference between the two embodiments is that the extending direction of the first connecting section 2612 against the first main section 2611 in one embodiment is opposite to that in the other embodiment.

According to some embodiments of this application, in the second direction X, the first connecting section 2612 extends toward both sides against the first main section 2611. In this case, the cross section of the first adapter piece 261 formed by the first connecting section 2612 and the first main section 2611 is T-shaped, thereby further enlarging the connection area between the first connecting section 2612 and the second adapter piece 262.

In other embodiments, the first adapter piece 261 may include just the first main section 2611 extending in the first direction Z. The second adapter piece 262 includes a second main section 2621 extending in the second direction X and a second connecting section 2622 connected to the first adapter piece 261. The second connecting section 2622 may be bent against the second main section 2621. For example, the second connecting section 2622 extends along the first direction Z.

According to some embodiments of this application, this application further provides a battery cell, including a shell, an electrode post 23, an electrode assembly 22, and the adapter component 26 described above. The shell includes an accommodation cavity. The electrode assembly 22 is accommodated in the accommodation cavity. The shell includes a housing 21 and an end cap 24. The housing 21 is integrally formed. The housing 21 includes two first sidewalls 211 disposed opposite to each other in a second direction X and two second sidewalls 212 disposed opposite to each other in a third direction Y. The two first sidewalls 211 and the two second sidewalls 212 close in to form the accommodation cavity. The housing 21 includes at least one opening 213 in a first direction Z. The first direction Z, the second direction X, and the third direction Y are perpendicular to each other. The electrode assembly 22 includes a body portion 221 and a tab 222 extending from the body portion 221 toward the opening. The tab 222 extends toward the opening 213. The electrode post 23 is disposed on a first sidewall 211. The end cap 24 is disposed at the opening to close the accommodation cavity. The first adapter piece 261 is connected to the electrode post 23. The second adapter piece 262 is connected to the tab 222.

According to some embodiments of this application, the battery cell 20 includes two electrode posts 23. The two electrode posts 23 are disposed on the two first sidewalls 211 respectively. The two tabs of the electrode assembly 22 are a positive tab and a negative tab respectively. The positive tab and the negative tab are disposed at a same end of the body portion 221. In this case, the battery cell 20 includes two adapter components 26. The positive tabs are connected to a corresponding electrode post 23 by one adapter component 26, so are the negative tabs.

In some other embodiments, the battery cell 20 may include more than two electrode assemblies. In this case, all the positive tabs of the more than two electrode assemblies may be connected to a corresponding electrode post 23 by one adapter component. All the negative tabs of the more than two electrode assemblies may be connected to the other corresponding electrode post 23 by one adapter component.

According to some embodiments of this application, this application further provides a battery. The battery includes the battery cell disclosed in any one of the foregoing technical solutions.

According to some embodiments of this application, this application further provides an electrical device. The electrical device includes the battery disclosed in any one of the foregoing technical solutions, and the battery is configured to provide electrical energy for the electrical device.

The electrical device may be any device or system that employs the battery.

Figure 11:
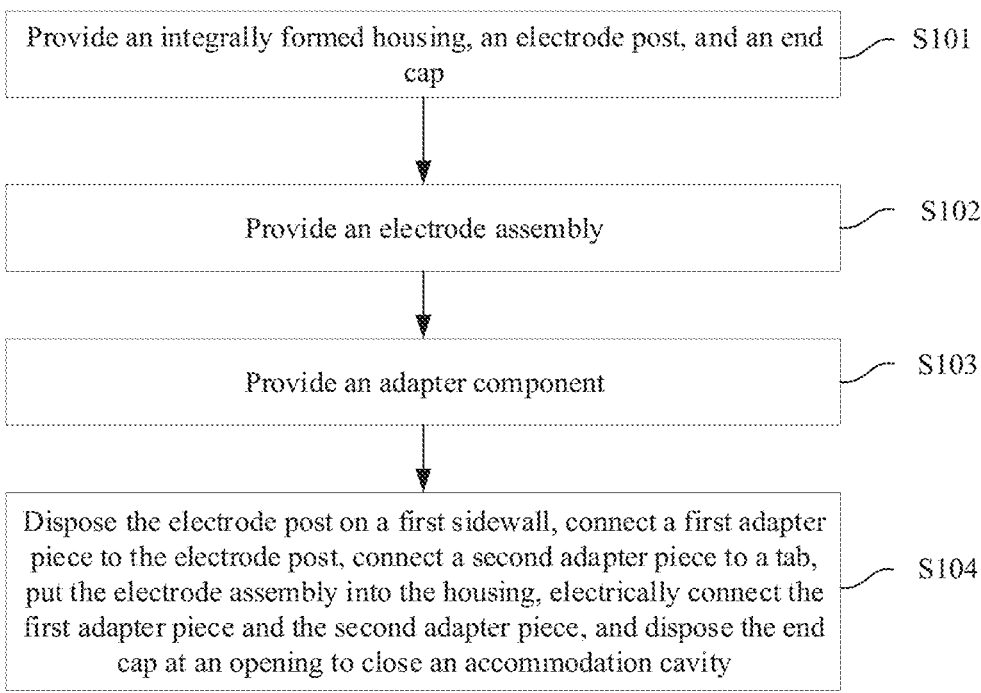
FIG. 11 is a schematic flowchart of a method for manufacturing a battery cell according to some embodiments of this application.

Referring to FIG. 11, according to some embodiments of this application, this application further provides a method for manufacturing a battery cell, including the following steps:

S101: Providing an integrally formed housing 21, an electrode post 23, and an end cap 24. The housing 21 includes at least one opening 213 in a first direction Z, and includes two first sidewalls 211 disposed opposite to each other in a second direction X and two second sidewalls 212 disposed opposite to each other in a third direction Y The two first sidewalls 211 and the two second sidewalls 212 close in to form an accommodation cavity. The first direction Z, the second direction X, and the third direction Y are perpendicular to each other.

S102: Providing an electrode assembly 22, where the electrode assembly 22 includes a body portion 221 and a tab 222 extending from the body portion 221 toward the opening 213.

S103: Providing an adapter component 26, where the adapter component 26 includes a first adapter piece 261 and a second adapter piece 262 disposed discretely.

S104: Disposing the electrode post 23 on the first sidewall 211, connecting the first adapter piece 261 to the electrode post 23, connecting the second adapter piece 262 to the tab 222, putting the electrode assembly 22 into the housing 21, electrically connecting the first adapter piece 261 and the second adapter piece 262, and disposing the end cap 24 at the opening to close the accommodation cavity.

In the method for manufacturing a battery cell, the electrode post 23 is disposed on the first sidewall 211 of the integrally formed housing 21. In this way, during loading of the electrode assembly into the housing, the electrode assembly does not need to be connected to the end cap in advance, thereby facilitating the loading of the electrode assembly into the housing, and simplifying the assembling process of the battery cell. Moreover, the adapter component 26 is designed to include a first adapter piece 261 and a second adapter piece 262 disposed discretely. Therefore, during assembling, the first adapter piece 261 may be connected to the electrode post 23 in advance, and then the second adapter piece 262 is connected to the tab 222 of the electrode assembly 22, and then the electrode assembly 22 is put into the housing 21. Subsequently, the ends of the first adapter piece 261 and the second adapter piece 262 are connected by a conductive structure, so that the electrode assembly 22 is loaded into the housing.

It is hereby noted that other steps may be added between the foregoing steps.

Figure 12:
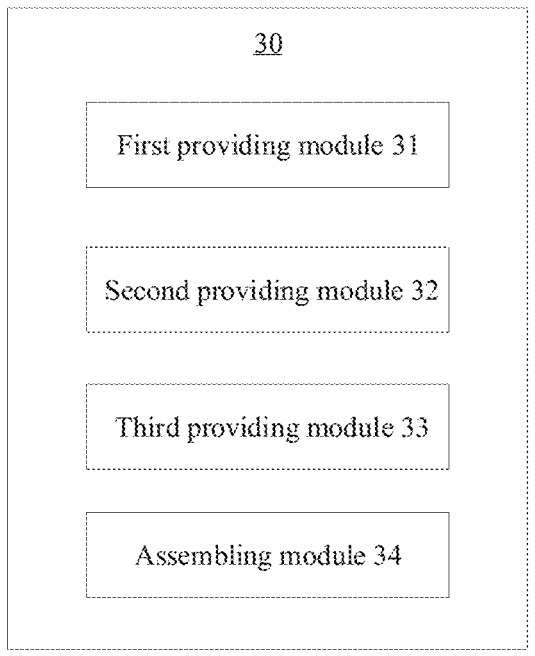
FIG. 12 is a structural diagram of a device for manufacturing a battery cell according to some embodiments of this application.

Referring to FIG. 12, according to some embodiments of this application, this application provides a device 30 for manufacturing a battery cell. The manufacturing device includes a first providing module 31, a second providing module 32, a third providing module 33, and an assembling module 34.

The first providing module 31 is configured to provide an integrally formed housing 21, an electrode post 23, and an end cap 24. The housing 21 includes at least one opening 213 in a first direction Z, and includes two first sidewalls 211 disposed opposite to each other in a second direction X and two second sidewalls 212 disposed opposite to each other in a third direction Y. The two first sidewalls 211 and the two second sidewalls 212 close in to form an accommodation cavity. The first direction Z, the second direction X, and the third direction Y are perpendicular to each other.

The second providing module 32 is configured to provide an electrode assembly 22, where the electrode assembly 22 includes a body portion 221 and a tab 222 extending outward from the body portion 221.

The third providing module 33 is configured to provide an adapter component 26, where the adapter component 26 includes a first adapter piece 261 and a second adapter piece 262 disposed discretely.

The assembling module 34 is configured to mount the electrode post 23 on a first sidewall 211, connect the first adapter piece 261 to the electrode post 23, connect the second adapter piece 262 to the tab 222, put the electrode assembly 22 into the accommodation cavity, electrically connect the first adapter piece 261 and the second adapter piece 262, and dispose the end cap 24 at the opening to close the accommodation cavity.

In the device for manufacturing a battery cell, the electrode post 23 is disposed on the first sidewall 211 of the integrally formed housing 21. In this way, during loading of the electrode assembly into the housing, the electrode assembly does not need to be connected to the end cap in advance, thereby facilitating the loading of the electrode assembly into the housing, and simplifying the assembling process of the battery cell.

The structure of a battery cell according to specific embodiments of this application is described in detail below with reference to FIG. 3 to FIG. 10.

As shown in FIG. 3, a battery cell 20 includes a housing 21, an end cap 24, and two electrode posts 23 disposed on the housing 21. Of the battery cell 20, a height direction extends along a first direction Z, a length direction extends along a second direction X, and a thickness direction extends along a third direction Y.

As shown in FIG. 4, the housing 21 includes two first sidewalls 211 disposed opposite to each other, two second sidewalls 212 disposed opposite to each other, a bottom wall, and an opening 213 opposite to the bottom wall.

As shown in FIG. 5 and FIG. 6, the battery cell 20 further includes an electrode assembly 22 disposed in the housing 21, and an adapter component 26 configured to connect the electrode assembly 22 and the electrode posts 23. The electrode assembly 22 includes a body portion 221 and two tabs 222 extending from the body portion 221 toward the opening. The two tabs 222 are opposite in polarity. One is a positive tab and the other is a negative tab. Each of the tabs 222 is connected to a corresponding electrode post 23 by the adapter component 26.

Figure 7:
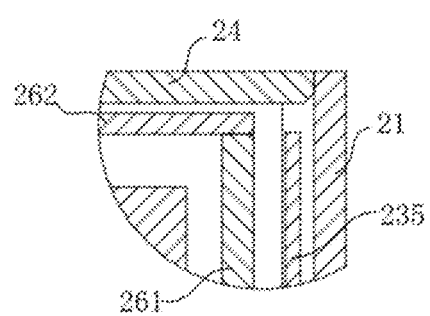
FIG. 7 is a schematic close-up view of a local structure of a part M shown in FIG. 6.

As shown in FIG. 7, the adapter component 26 includes a first adapter piece 261 and a second adapter piece 262 disposed discretely. The first adapter piece 261 and the second adapter piece 262 are perpendicular to each other. The first adapter piece 261 is disposed on an inner side of the first sidewall 211 of the housing 21 and connected to the electrode post 23. The second adapter piece 262 is disposed on an inner side of the end cap 24 and connected to the tab 222.

As shown in FIG. 8, the electrode post 23 includes an inner post 231, an outer post 232, a sealing sleeve 233, a sealing ring 234, a first insulation spacer 235, and a second insulation spacer 236.

The inner post 231 includes a post body disposed in a post mounting hole 211a and a connecting plate configured to be connected to the first adapter piece 261. The connecting plate is connected to an end of the post body. The sealing sleeve 233 sheathes the inner post 231 to isolate the first sidewall 211 from the inner post 231. The sealing ring 234 is pressed against an outer wall of the sealing sleeve 233 so that an inner wall of the sealing sleeve 233 is in contact with an outer wall of the inner post 231. The drawing shows a state when the inner wall of the sealing sleeve is out of contact with the outer wall of the inner post during the assembling. However, after completion of assembling, the inner wall of the sealing sleeve 233 is in contact with the outer wall of the inner post 231. To avoid electrical connection between the electrode post 23 and the housing 21, a first insulation spacer 235 is disposed between the connecting plate of the inner post 231 and an inner wall face of the first sidewall 211 of the housing 21. The first insulation spacer 235 extends along the first direction Z until a position close to the end cap 24. In this way, the first insulation spacer 235 can not only prevent electrical connection between the inner post 23 and the housing 21, but also prevent electrical connection between the first adapter piece 261 and the housing.

As shown in FIG. 8, the post body passes through the post mounting hole 211a of the first sidewall 211 and is partly exposed outside the first sidewall 211. The outer post 232 is a post ring with an inner hole. The outer post 232 sheathes the inner post 231. A second insulation spacer 236 is disposed between the outer post 232 and an outer wall face of the first sidewall 211 of the housing 21. The second insulation spacer 236 includes a groove configured to snap-fit the outer post 232.

As shown in FIG. 9 and FIG. 10, the adapter component 26 includes a first adapter piece 261 and a second adapter piece 262 disposed discretely. The first adapter piece 261 is configured to be connected to the electrode post 23, and the second adapter piece 262 is configured to be connected to the tab 222. The first adapter piece 261 includes a first main section 2611 extending in the first direction Z and a first connecting section 2612 extending in the second direction X. The second adapter piece 262 includes a second main section 2621 and a second connecting section 2622 that both extend in the second direction X. The first main section 2611 is connected to the electrode post 23. The first connecting section 2612 is connected to the second adapter piece 262.

A method for manufacturing a battery cell 20 according to an embodiment of this application includes: providing an integrally formed housing 21, two electrode posts 23, an electrode assembly 22, two adapter components 26, and an end cap 24, fitting the two electrode posts 23 onto two first sidewalls 211 of the housing 21 respectively, and connecting two first adapter pieces 261 of the two adapter components 26 to the two electrode posts 23 respectively (for example, by welding), and specifically, connecting a first adapter piece 261 to an inner electrode post 231; welding second adapter pieces 262 of the two adapter components 26 to two tabs 222 respectively (for example, by ultrasonic welding or laser welding), and then putting the electrode assembly 22 with the welded second adapter pieces 262 into the housing 21, electrically connecting the two first adapter pieces 261 to ends of the two second adapter pieces 262 respectively, thereby completing electrical connection between one electrode post 23 and one tab 222; connecting the other electrode post 23 and the other tab 222 in the same way; and finally, welding the end cap 24 to the housing 21 to seal the battery cell 20.

Further, insulation treatment needs to be performed between the electrode assembly 22 and the housing 21, for example, by being wrapped with a dielectric film or blue tape made of Mylar.

Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A battery cell, comprising a shell, two electrode posts, an electrode assembly, and an adapter,
   wherein the adapter comprises a first adapter and a second adapter disposed discretely, the first adapter is connected to one of the electrode posts, the second adapter is connected to a tab of the electrode assembly, the first adapter substantially extends along a first direction, the second adapter substantially extends along a second direction, the first direction intersects the second direction, and the first adapter is connected to the second adapter by a conductive structure, and
   wherein the shell comprises an accommodation cavity; the electrode assembly is accommodated in the accommodation cavity; the shell comprises a housing and an end cap; the housing is integrally formed; the housing comprises two first sidewalls disposed opposite to each other in the second direction and two second sidewalls disposed opposite to each other in a third direction; the two first sidewalls and the two second sidewalls close in to form the accommodation cavity; the housing comprises at least one opening in the first direction; the first direction, the second direction, and the third direction are perpendicular to one another; the electrode assembly comprises a body structure and the tab extending in the first direction from the body structure toward the opening;

the two electrode posts are disposed to respectively pass through the two first sidewalls;

the end cap is disposed at the opening to close the accommodation cavity;

wherein the housing is filled with electrolyte.

2. The battery cell according to claim 1, wherein the tab comprises a positive tab and a negative tab, and the positive tab and the negative tab are disposed at a same end of the body structure.

3. The battery cell according to claim 1, wherein the two electrode posts are riveted or injection-molded to respectively pass through the two first sidewalls.

4. A battery, comprising the battery cell according to claim 1.

5. An electrical device, comprising the battery according to claim 4.

6. The battery cell according to claim 1, wherein the first adapter comprises a first main structure and a first connector disposed at an end of the first main structure, and the first main structure is connected to one of the electrode posts; and the first main structure extends along the first direction, the first connector extends along the second direction, and the first connector is connected to the second adapter.

7. The battery cell according to claim 6, wherein the second adapter comprises a second main structure and a second connector connected to the first connector, and the second main structure is connected to the tab, and the first connector extends toward a side close to the second main structure against the first main structure; or, the first connector extends toward a side away from the second main structure against the first main structure; or, in the second direction, the first connector extends toward both sides against the first main structure.

8. The battery cell according to claim 6, wherein the first connector and the first main structure are integrally formed.

9. The battery cell according to claim 1, wherein the conductive structure comprises a welding structure, a conductive adhesive bonding structure, a riveting structure, or a conductive element.

* * * * *